United States Patent [19]

Hasegawa et al.

[11] Patent Number: 5,764,326
[45] Date of Patent: Jun. 9, 1998

[54] MULTIPLE DIRECTION ROTATABLE LIQUID CRYSTAL DISPLAY DEVICE AND A METHOD FOR ITS MANUFACTURE

[75] Inventors: Masaki Hasegawa, Kamakura; Yoichi Taira, Setagaya-ku, both of Japan

[73] Assignee: International Business Machines Corporation, Armonk, N.Y.

[21] Appl. No.: 543,671

[22] Filed: Oct. 16, 1995

[30] Foreign Application Priority Data

Oct. 14, 1994 [JP] Japan ................... 6-249719

[51] Int. Cl.⁶ .................................. G02F 1/1337
[52] U.S. Cl. ................................ 349/124
[58] Field of Search ............... 359/76, 77; 349/124, 349/134, 136

[56] References Cited

U.S. PATENT DOCUMENTS

| 5,587,822 | 12/1996 | Lee ............... | 349/124 |
| 5,604,615 | 2/1997 | Iwagoe ............. | 349/124 |
| 5,657,102 | 8/1997 | Mizushima et al. ... | 349/124 |

FOREIGN PATENT DOCUMENTS

| 0525478 | 5/1993 | European Pat. Off. . | |
| 0613037 | 8/1994 | European Pat. Off. . | |
| 56-19030 | 2/1981 | Japan ............... | 359/76 |
| 5-5886 | 1/1993 | Japan . | |
| 5034699 | 2/1993 | Japan . | |
| PUPA5-232473 | 9/1993 | Japan . | |
| 6175132 | 6/1994 | Japan . | |
| 6222366 | 8/1994 | Japan . | |
| PUPA6-222366 | 12/1994 | Japan . | |

OTHER PUBLICATIONS

Iwakoshi, 07–318942 (Abstract) "Liquid Crystal Display Device, its Production and Apparatus for Production therefor", Dec. 1995.

Murasii et al, "photosensitive Orientants for liquid crystal alignment", pp. 161–168, May 1993.

Kawanishi et al, "nematic Homogeneous alignment regulated by the polarization photchrosism of surface azobensenes", 153–158, 1992.

*Primary Examiner*—William L. Sikes
*Assistant Examiner*—James A. Dudek
*Attorney, Agent, or Firm*—Scully, Scott, Murphy & Presser

[57] ABSTRACT

A liquid crystal display device and method of making same. The device, which includes a first substrate; a first orientation polymer film, disposed on the first substrate, having at least one segment whose molecules are aligned in a linear direction; a second substrate; a second orientation polymer film disposed on the second substrate; and a liquid crystal material disposed between the first and second orientation films, is fabricated in a method which includes applying a polymer to a first substrate to form a polymer film; rubbing the first substrate to form a polymer orientation film; irradiating, with a linear polarized electromagnetic wave, at least one segment of the first substrate on which rubbing has occurred; repeating the procedure conducted on the first substrate to a second substrate to form a second polymer orientation film; and introducing a liquid crystal between the first and second polymer orientation films.

7 Claims, 10 Drawing Sheets

Surface of a polyimodo orientation film

FIG. 12C

Region where a benzene ring is broken

Cross sectional view for a polymide orientation film

MULTIPLE DIRECTION ROTATABLE LIQUID CRYSTAL DISPLAY DEVICE AND A METHOD FOR ITS MANUFACTURE

The present invention relates to a method for manufacturing a substrate for a liquid crystal display device, a method for manufacturing a liquid crystal display device, and a liquid crystal display device. More particularly, the present invention pertains to a method for fabricating a substrate for a liquid crystal display device, which employs liquid crystal to display an image, etc., a method for fabricating such a liquid crystal display device, and such a liquid crystal display device.

A liquid crystal display device is designed by sealing liquid crystal between paired transparent substrates that are located at a predetermined interval. In other words, a liquid crystal molecule has an elongated shape and an anisotropy of a refractive index. Therefore, a pixel can be formed by employing a difference between the state of the liquid crystal molecules when they are arranged in the direction ill which a voltage is applied and the state of the liquid crystal molecules when no voltage is applied. As is well known, an orientation film is formed on each of the substrates to align the liquid crystal molecules at a predetermined inclination angle (a so-called tilting angle). A polymer, such as polyimide, is used to form the orientation film. An orientation film is formed by rubbing the polymer with cloth (so-called rubbing) and providing an orientation direction. During this rubbing process, pixel electrodes and non-linear elements, which are mounted on the substrate, are coated with a polymer film, such as polyimide film, and the surface of this thin film is rubbed by a rotating roller, around which a cloth, such as velvet, is wrapped. With this method, the liquid crystal molecules are oriented in the direction in which the orientation films on the paired substrates are rubbed. Since, generally, the paired substrates are rubbed in opposite directions, so as to form a right angle, the liquid crystal molecules are spirally positioned in the direction from one substrate toward the other substrate.

When an intermediate gray scale level between the black level and the white level is displayed, the liquid crystal molecules are aligned diagonally, relative to the substrates, by the balance of the forces of the electronic field and of the orientation films. An angle of the liquid crystal relative to the substrates varies depending on the angle of viewing, and the brightness differs. Or the colours have a different appearance for a colour display.

To improve a viewing angle characteristic, such as the acquisition of a high contrast at a wide-viewing angle, it has recently been proposed that a liquid crystal device be formed by a multi-domain method that divides one pixel into a plurality of pixels, and changes, in the individual divided domains, the directions in which individual planes of the liquid crystals are inclined due to the electronic field.

This method includes a mask rubbing method durring which a mask having a predetermined shape is rubbed while it is being shifted (K. Takatori et. al., "A Complementary TN LCD with Wide-Viewing Angle Grayscale," Japan Display '92, pp. 591), a method of coating a plurality of orientation film materials (T. Kamada et. al., "Wide Viewing Angle Full-Colour TFT LCDs," Japan Display '92, pp. 886), a method of changing the characteristic of an orientation film by irradiating ultraviolet light, etc. (Japanese Unexamined Patent Application No. Hei 5-210099), or the like. The procedures and the processing for the mask rubbing method and for the method that involves the application of a plurality of orientation film materials are complicated.

However, according to the method that involves irradiation with ultraviolet light, etc., and changes the characteristic of the orientation film, only a mask that has a light transmitting area and a light non-transmitting area is positioned and irradiation with ultraviolet light is performed, so that a liquid crystal display device for which a viewing angle characteristic is improved by simple procedures can be provided. This method employs a phenomenon whereby an inclination angle (a so-called pretilt angle) for liquid crystal relative to a polyimide orientation film is changed by irradiating the orientation film with ultraviolet light. Different volumes of ultraviolet light are employed to irradiate the opposing orientation films, so that multi-domains can be provided, while the rubbing is performed in only a single direction.

A liquid crystal display device that is fabricated by an ultraviolet light irradiation method, etc., may flicker. In other words, in the liquid crystal display device, liquid crystal is activated by an alternating current voltage, whose positive and negative values are identical, to keep the orientation film from absorbing ions from the liquid crystal. In the liquid crystal display device where different volumes of ultraviolet light are employed to irradiate facing orientation films, therefore, an apparent main voltage of the alternating drive current may be shifted.

In more detail, when ultraviolet light is employed to irradiate a polyimide orientation film, a portion where ions are to be absorbed occurs in the polyimide. The amount of ions absorbed by this portion depends on the irradiation volume of ultraviolet light. Therefore, when different volumes of ultraviolet light are employed to irradiate the facing orientation films, portions where the amount of ions that are absorbed differ occur on the orientation films. Even if liquid crystal is driven by an alternating current, different amounts of ions in the liquid crystal are absorbed by the orientation films, and an electric potential arises between the orientation films. Therefore, even upon tile application of an alternating current at corresponding positive and negative voltages, either a positive or a negative offset occurs due to the potential that exists between the orientation films, and the liquid crystal is driven by differing positive and negative voltages. As a result, the brightness of a screen varies and causes flickering. It has been confirmed by experimentation that as the volume of the ultraviolet light with which the orientation film is irradiated is reduced, the flickering is likewise reduced.

However, to acquire a multi-domain liquid crystal display device that has an improved viewing angle characteristic, a predetermined change in the pretilt angle of the liquid crystal display device is required. Although it is desired that a polyimide be developed that is highly sensitive to ultraviolet light and that has a preferable liquid crystal orientation, it is not easy to produce a new polyimide, and an apparent primary voltage is shifted.

Accordingly, the present invention provides a method for manufacturing a liquid crystal display device comprising the steps of: applying polymer to a first substrate to form a polymer film; performing a rubbing process on the first substrate, on which the polymer film is formed, to provide an orientation direction and form a polymer orientation film; irradiating, with a linearly polarized electromagnetic wave, at least one segment of the first substrate on which the rubbing process has been performed; applying polymer to a second substrate to form a polymer film; performing a rubbing process on the second substrate, on which the polymer film is formed, to provide an orientation direction and form a polymer orientation film; positioning the first and second substrates bearing the polymer orientation films at a predetermined interval from each other and such that said films face each other; and introducing liquid crystal between the first and second substrates.

Viewed from another aspect the present invention provides a liquid crystal display device comprising: a first substrate having a polymer orientation film which has undergone a rubbing process, one segment of which has been irradiated with a linearly polarized electromagnetic wave; a second substrate having a polymer orientation film which has undergone a rubbing process, one segment of which has been irradiated with a linearly polarized electromagnetic wave; said substrates positioned such that the polymer orientation films are facing each other so as to form a pixel with the irradiated first segment and irradiated second segment; and liquid crystal material positioned between the first substrate and the second substrate.

The present invention provides a method for fabricating a substrate, for a liquid crystal display device, that requires only simple procedures to manufacture a liquid crystal display that has a preferable viewing angle characteristic, and a method for fabricating such a liquid crystal display device. It provides a liquid crystal display device with a simple structure that has a desirable viewing angle characteristic.

Since a linearly polarized electromagnetic wave is employed to irradiate at least one segment of a substrate on which is formed a polymer orientation film that is orientated in the direction in which it is rubbed, a pretilt angle that is obtained when liquid crystal is attached to the polymer orientation film can be changed. In other words, the irradiation by the linearly polarized electromagnetic wave cuts off or destroys the molecule chain of a polymer material, such as polyimide, that is positioned in the polarizing direction. On the other hand, a molecule chain that extends orthogonally to the polarizing direction is not much affected by the irradiation. Therefore, the pretilt angle of only one segment of the substrate can be changed during the irradiation by an electromagnetic wave. A liquid crystal display device that has such substrates can have a plurality of directions in which liquid crystal is rotated upon an electric field, so that a liquid crystal display device that has a preferable, extended viewing angle range can be provided. The linear polarizing direction may follow the direction in which the polymer orientation film is rubbed.

A linearly polarized electromagnetic wave is employed to irradiate at least one segment of the first substrate, on which is the polymer orientation film after the rubbing process is performed, the orientation films on the first and the second substrates are so located that they face each other while the first and second substrates are fixed to each other at a predetermined interval, and liquid crystal is introduced between these substrates. In the thus fabricated liquid crystal display device, as the pretilt angle is changed on only one segment, and the liquid crystal can be rotated in multiple directions upon the application of an electric field, a preferable viewing angle range can be extended.

A linearly polarized electromagnetic wave is employed to irradiate at least one segment of the second substrate that is rubbed. Tile thus fabricated liquid crystal display device has regions on its opposing substrates wherein the pretilt angle is changed, and for either substrate, or for both substrates, the liquid crystal can be rotated in multiple directions by the application of an electric field. Therefore, a desirable viewing angle range can be extended by combining the first and the second substrates.

Since the first and the second substrates are fixed to each other so that the electromagnetic-wave irradiated regions of the first and the second substrates overlap partially or entirely, or do not overlap at all, the directions in which liquid crystal is rotated by the application of an electric field can be multiple, within a predetermined region, for either substrate or for both substrates. Therefore, a preferable viewing angle range can be further extended.

The irradiation direction for a linearly polarized electromagnetic wave can correspond to the direction in which the polymer orientation film is rubbed. The composition of the polymer material in the direction that nearly corresponds to the orientation direction of the liquid crystal can be changed, and the pretilt angle of the liquid crystal in the direction that corresponds to the rubbing direction can also be changed. According to claim 7 of the present invention, since the irradiation direction for a linearly polarized electromagnetic brave can correspond to the direction in which the liquid crystal is aligned when it is attached to the polymer orientation film, the pretilt angle that is actually formed by the liquid crystal can be changed.

Since the linearly polarized electromagnetic wave can he employed to irradiate one segment of a region that corresponds to a pixel, the pretilt angle can be altered in one pixel, and for each pixel a preferable viewing angle range can be extended each pixel.

A liquid crystal display device, which is fabricated by the above method, comprises: the first substrate, whereon a linearly polarized electromagnetic wave is employed to irradiate one segment of a region that corresponds to a pixel on a polymer orientation film, which is obtained by applying a polymer material and performing a rubbing process to provide an orientation direction; the second substrate, whereon a linearly polarized electromagnetic wave is employed to irradiate at least one segment of a polymer orientation film, which is obtained by applying a polymer material and performing a rubbing process to provide an orientation direction, that is fixed to the first substrate at a predetermined interval, after the first and the second substrate are so positioned that the polymer orientation films are facing, so as to form one pixel with the regions of the first and the second substrates that were irradiated by an electromagnetic wave; and liquid crystal, which is introduced between the first and the second substrates. Therefore, a liquid crystal display device with a simple structure that has a desirable viewing angle characteristic can be acquired.

For the liquid crystal display device a substrate can be employed that has been irradiated by the linearly polarized electromagnetic wave in the direction that corresponds to the rubbing direction for the polymer orientation film. Therefore, the pretilt angle of the liquid crystal in the direction that corresponds to the rubbing direction can be changed, so that a liquid crystal display device that has a more desirable viewing angle characteristic can be acquired.

In order that the invention may be fully understood preferred embodiments thereof will now be described, by way of example only, with reference to the accompanying drawings in which.

One embodiment of the present invention will now be described in detail while referring to the accompanying drawings. This embodiment will be explained by using a so-called active matrix type liquid crystal display device (for example, a 10-inch diagonal, laterally elongated rectangular device with 640×480 pixels).

Figure 2:
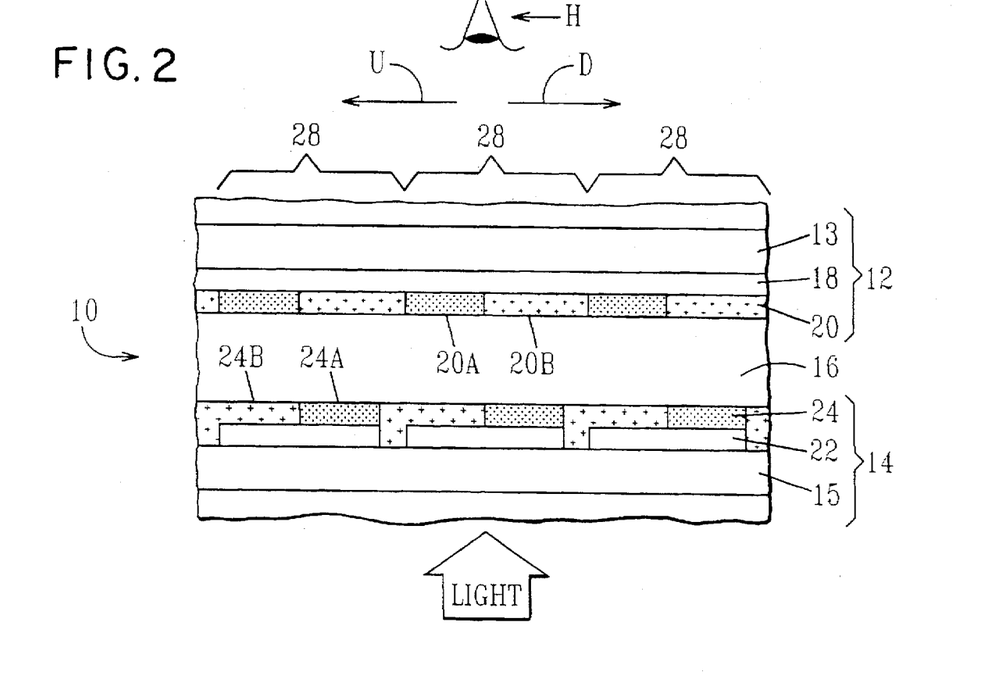
FIG. 2 is a cross sectional view of a liquid crystal display device that is fabricated by a method for fabricating a liquid crystal display device according to this embodiment.
Figure 3:
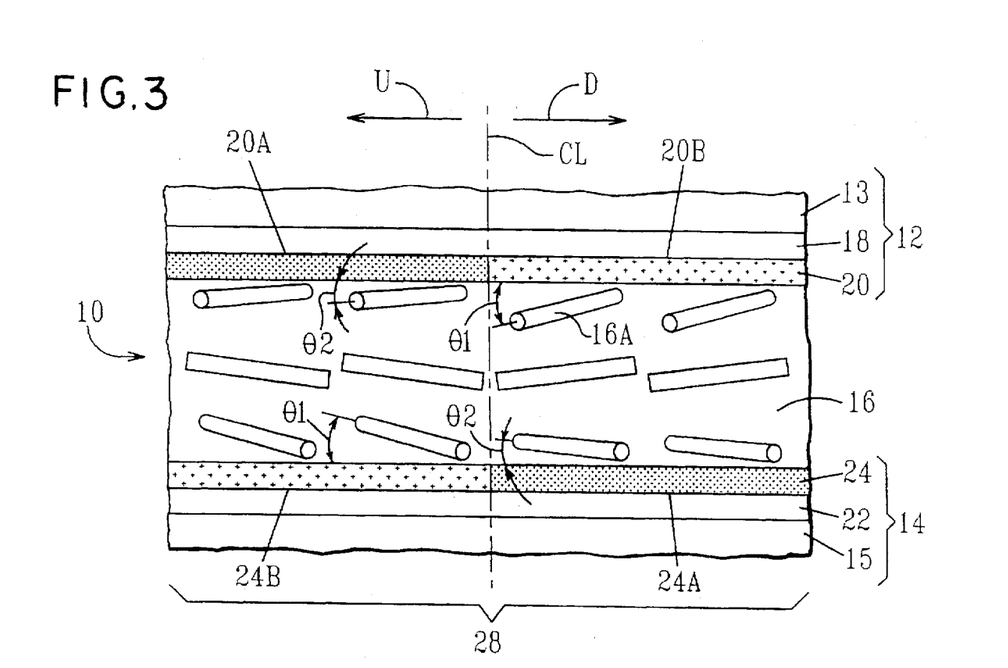
FIG. 3 is an enlarged cross sectional view of a pixel portion.

As is shown in the cross sectional views in FIGS. 2 and 3, the liquid crystal display device 1.0 in the embodiment has nematic liquid crystal 16 introduced between the colour filter substrate 12 and the TFT substrate 14.

A colour filter (not shown) is formed on the internal surface of the glass substrate 13 of the colour filter substrate 12. A plurality of common electrodes 18, such as INTO film, are formed on the colour filter, and a polyimide orientation film 20 is deposited on the common electrodes 18.

A plurality of pixel electrodes 22 and a well known TFT element (not shown) are formed on the internal surface of a glass substrate 15 of the TFT substrate 14, and a polyimide orientation film 24 is formed on the pixel electrode 22.

As is shown in FIG. 2, light is transmitted from the side of the TFT substrate 14 of the liquid crystal display 10, so that an observer H looks at a display through the colour filter substrate 12. It should be noted that the direction indicated by the arrow L is to the left when the observer H looks at the liquid crystal display device 10 from a normal position, the direction indicated by the arrow R is to the right when the observer H looks at the liquid crystal device 10 from a normal position, the direction indicated by the arrow D is down when the observer 11 looks at the liquid crystal display device 10 from a normal position, and the direction indicated by the arrow It is up when the observer H looks at the liquid crystal display device 10 from a normal position.

Figure 4:
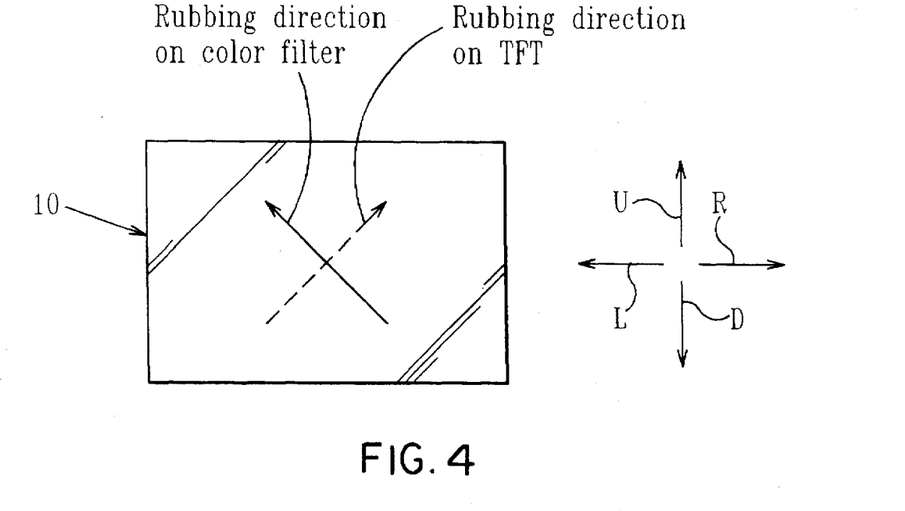
FIG. 4 is a plan view of the rubbing directions for a liquid crystal display device as viewed from a colour filter substrate.

As is shown in FIG. 4, employed for this liquid crystal display device 10 is liquid crystal to rails a right-twisted chiral agent is added. When viewed from the colour filter substrate 12 side, the orientation film 20 of the colour filter substrate 12 is rubbed to the upper left, as is indicated by the solid line in FIG. 4. For spray orientation, the orientation film 24 of the TFT substrate 14 is rubbed to the upper right, as is indicated by the broken lines in FIG. 4, which is orthogonal to the rubbing direction for the orientation film 20.

As is shown in FIG. 3, in the liquid crystal display device 10 tile pretilt angles of molecules 16A, of the liquid crystal 16, differ in the upper and lower halves of the pixel 28 that are defined by the vertical center portion CF. According to this embodiment, for the molecules 16A, of the liquid crystal 16, that contact the orientation film 20, of the colour filter substrate 12, the pretilt angles in the lower half of the pixel 28 (the side indicated by the arrow D in FIG. 3) are greater than the pretilt angles in the upper half (the side indicated by the arrow U in FIG. 3) ($\Theta 2 < \Theta 1$). For the molecules 16A, of the liquid crystal 16, that contact the orientation film 24, of the TFT substrate 14, the pretilt angles $\Theta 2$ in the lower half of the pixel 28 are smaller than the pretilt angles $\Theta 1$ in the upper half. As the molecules 16A, of the liquid crystal 16, in the center portion are affected by the molecules 16A that have the greater pretilt angles, and the colour filter substrate 12 and the TFT substrate 14 are not positioned parallel to each other, the upper and lower halves of the pixel 28 are pretilt ed in opposite directions. Therefore, as the direction for a preferable viewing angle for the tipper half of the pixel 28 can be the opposite of the direction in which the liquid crystal molecules in the lower half are rotated by the application of an electric field, the preferable, viewing angle range can be_extended and the viewing angle characteristics can be arranged symmetrically in the up and down directions.

Figure 1:
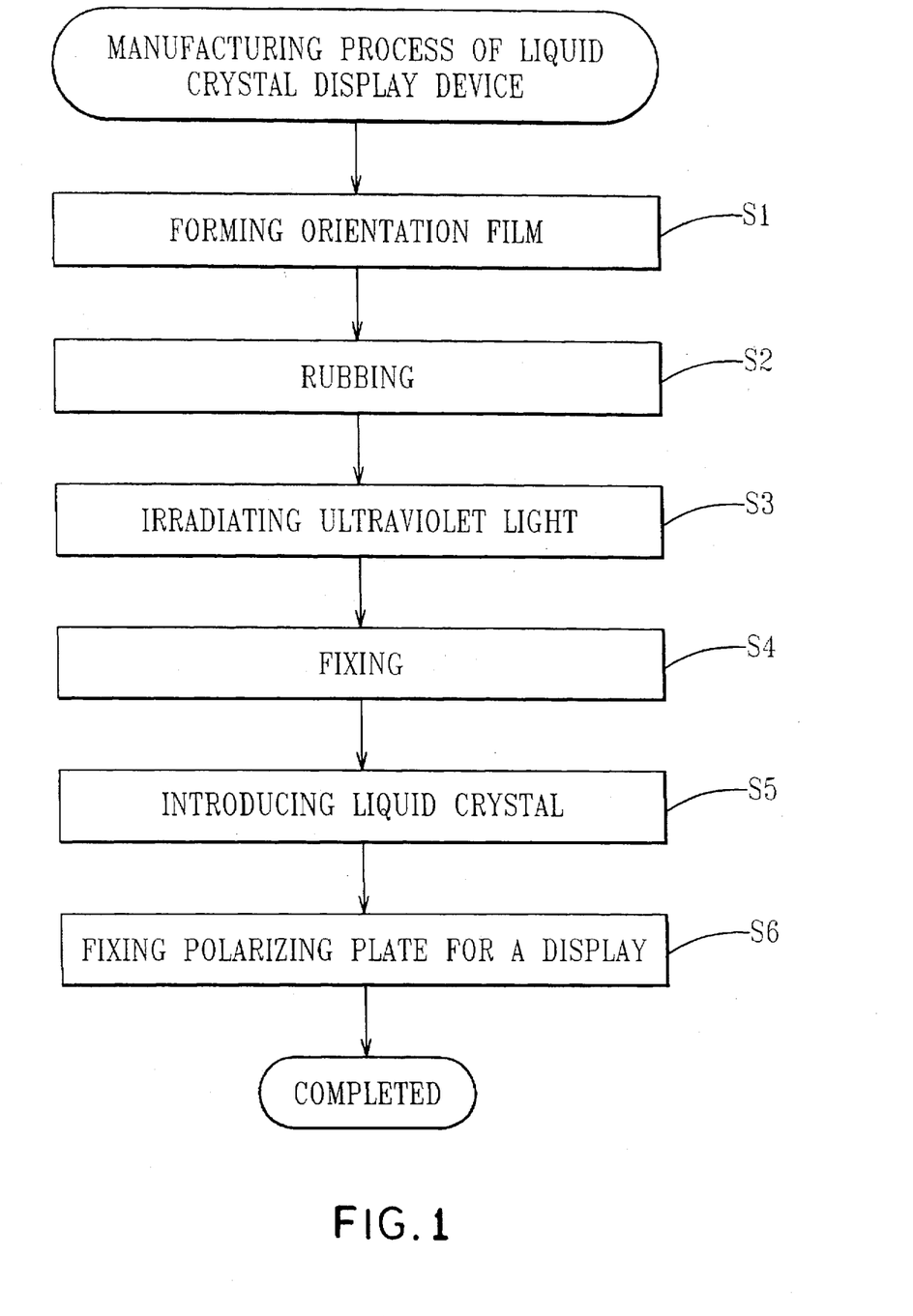
FIG. 1 is a flowchart for the fabrication processing for a liquid crystal display device according to one embodiment of the present invention.

The method for fabricating the liquid crystal display device 10 in this embodiment will now be described while referring to the flowchart for fabrication procedures in FIG. 1.

When the manufacture of the lipid crystal display device 10 is begun, at step S1 orientation films ale formed on the colour filter substrate 12 and the TFT substrate 14.

First, a polyimide solution of about 600 angstrom is applied to tile surface of the TFT substrate 14 where an active element (not shown) is formed. The application the polyimide solution can be performed by printing or by spincoating. The polyimide solution applied to the TFT substrate 14 is then dried by irradiating it with infrared light or heating it with a dryer (not shown) (e.g., a hot plate). The polyimide orientation film 24 is thus formed on the TFT substrate 14. In this manner, an almost uniformly applied polyimide orientation film 24 is acquired.

Then, the orientation film 20 is formed on the colour filter substrate 12 in the same manner as for the TFT substrate 14.

After the orientation films 20 and 24 are formed, at step 52 the rubbing process is performed on the colour filter substrate 12, on which the orientation film 20 is formed, and the TFT substrate 14, on which the orientation film 24 is formed, so that they are twisted at 90° in spray orientation.

At step S3, ultraviolet light is employed to irradiate the colour filter substrate 12 and the TFT substrate 14, on which the rubbing process has been performed, to produce the liquid crystal conditions that provide different pretilt angles within a single pixel.

As is well known, when an electromagnetic wave, such as ultraviolet light, is employed to irradiate polyimide, which is used to form the orientation films 20 and 24 in this embodiment, the pretilt angles of the molecules 16A, of the liquid crystal 16, are changed when the molecules 16A have settled. The present applicants acquired through experimentation the fact that when the electromagnetic wave is linearly polarized in the direction that is orthogonal or parallel to the rubbing direction and is then irradiated, the pretilt angle is changed. The experimental results are shown as the relationship between the irradiation energy and the pretilt angle in FIG. 5.

Figure 5:
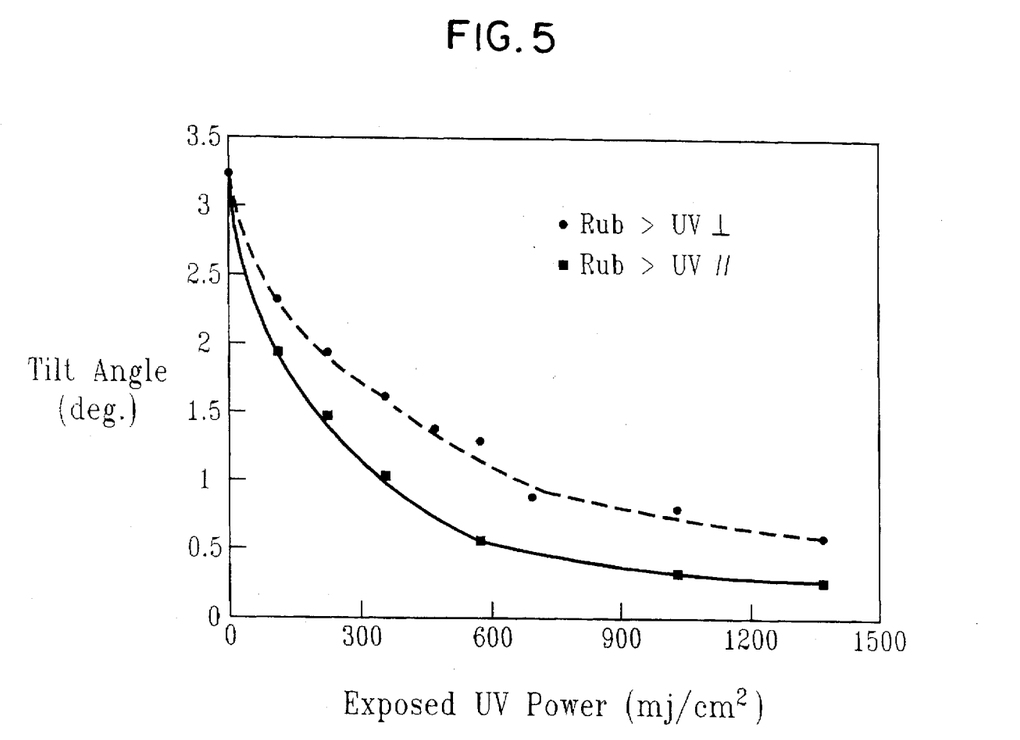
FIG. 5 is a characteristic graph representing the relationship between ultraviolet light irradiation energy and a pretilt angle.

As is apparent from the graph in FIG. 5, when irradiation by an electromagnetic wave is irradiated in the linear polarizing direction, which is parallel to the rubbing direction (the characteristic indicated by the solid line in FIG. 5), the change in the pretilt angle is greater than is the change in the pretilt angle when an electromagnetic wave is irradiated in the linear polarizing direction, which is perpendicular to the rubbing direction (the characteristic indicated by the broken lines in FIG. 5). Therefore, a great change in the pretilt angle can he obtained by the expenditure of only a little electromagnetic wave energy. For example, when the pretilt angle in FIG. 5 is about 1° an energy expenditure of approximately 600 mJ/cm$^2$ is required for the irradiation with an electromagnetic wave that is linearly polarized in a direction that is perpendicular to the rubbing direction. On the other hand, only around half the energy, approximately 300 mJ/cm$^2$, is required for the irradiation with an electromagnetic wave that is linearly polarized in a direction that is parallel to the rubbing direction.

Figure 6:
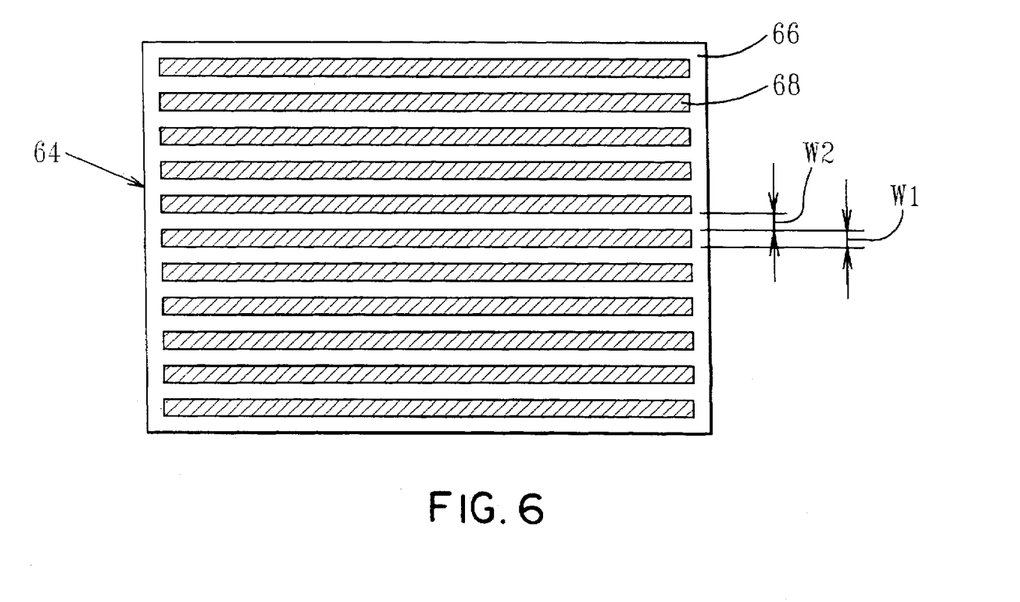
FIG. 6 is a plan view showing a mask.
Figure 7A:
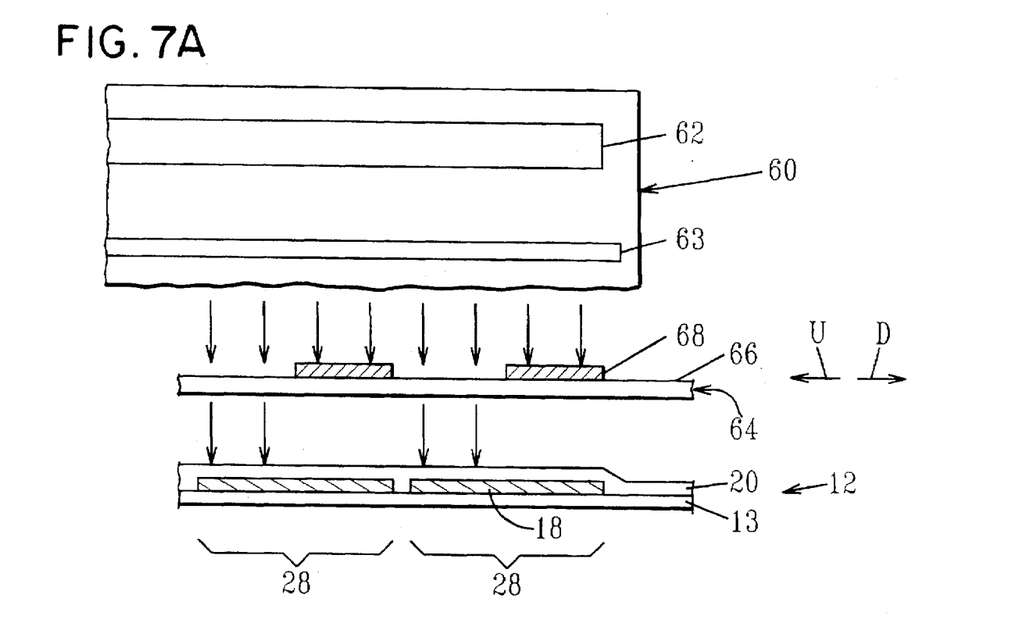
FIG. 7A, a cross sectional view of an ultraviolet light irradiation device, a colour filter substrate, and a mask, shows the position of the mask when an electromagnetic wave is employed to irradiate the colour filter substrate.
Figure 7B:
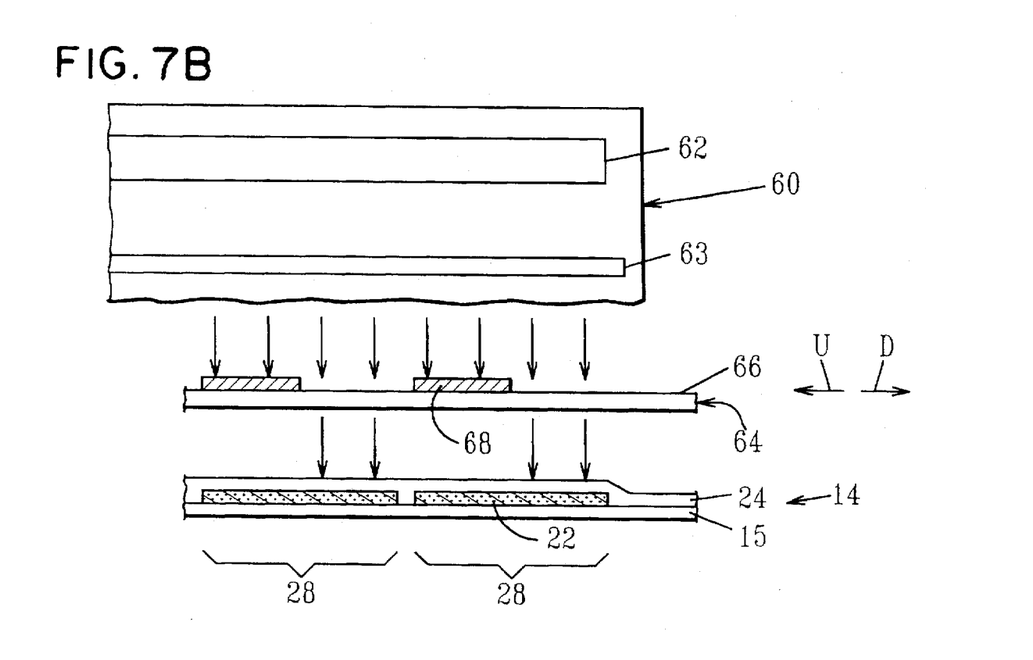
FIG. 7B, a cross sectional view of an ultraviolet light irradiation device, a TFT substrate, and a mask, shows the position of the mask when an electromagnetic wave is employed to irradiate the TFT substrate.

In this embodiment, therefore, at step S3 ultraviolet light that is linearly polarized in the direction that corresponds to the rubbing direction is employed to irradiate the colorer filter substrate 12 and the TFT-substrate 14 on which the rubbing process has been performed In this embodiment, the ultraviolet light irradiation device 60 and a mask 64, shown in FIG. 6, are employed for the irradiation of segments of orientation films. The ultraviolet light irradiation device 60 incorporates an ultraviolet light source 62, such as an ultraviolet lamp, and has a polarization element 63 for linearly polarizing the light located at the emitting side of the ultraviolet light source 62, as is shown in FIG. 7. The ultraviolet light that is emitted by the ultraviolet light irradiation device 60 is a linearly polarized electromagnetic wave.

The ultraviolet light source for this embodiment is any device that can procedure an electromagnetic wave that includes a wavelength that falls within the ultraviolet light range, and may contain the components of the ultraviolet wavelength range in the energy of the irradiated electromagnetic wave. The light source is not limited to one that produces only an ultraviolet light.

A laser device that employs and ultraviolet wavelength range as an oscillation wavelength range may be used as the ultraviolet light source 62. Since a laser device normally can emit linearly polarized light, a linearly polarized laser beam that is emitted by the laser device can be employed. In this case, since the divergence of the laser beam of a gas dynamic laser device is low, a diverting lens may be located on the emitting side.

The mask 64 is so formed by depositing silver 68, which reflects an electromagnetic wave in the ultraviolet range, in a Louvre patter n on a glass substrate 66. The deposited strips of the silver 68 have a predetermined width WI (e.g., about 100 μm), and are positioned at a predetermined interval W2 (e.g., about 100 μm). The material that may be deposited on the glass substrate 66 is not limited to silver, but may be any material that can reflect, or absorb, an electromagnetic wave that is produced by the ultraviolet light irradiation device 60. A multi-layer dielectric film, for example, may be formed and employed as a replacement of the silver 68.

Next, the surface of the orientation film, i.e., the orientation film 20 on the colour filter substrate 12, is so positioned that it faces up. As is shown in FIG. 7A, the mask 64 is positioned near the colour filter substrate 12 with a strip of the silver 68 located opposite one segment (the lower portion in FIG. 7A) of a pixel that has not yet irradiated with ultraviolet light. The ultraviolet light irradiation device 60 is located above the mask 64 and ultraviolet light is employed to irradiate the colour filter substrate 12. Thus, the ultraviolet light is employed to irradiate the other segment (the upper portion in FIG. 7A) of the pixel. As a result, a polyimide orientation film 20 is so formed that various pretilt angles are provided in a single pixel by employing the linearly polarized ultraviolet light to irradiate the colour filter substrate 12.

In this manner, an orientation film 20 is provided that has a characteristic that, when ultraviolet light is employed to irradiate the upper half of the pixel 28, the pretilt angles of the molecules 16A, of the liquid crystal 16, which contact the upper half of the pixel 28 on the colour filter substrate 12, become smaller, while the pretilt angle of the molecules 16A, of the liquid crystal 16, which contacts the lower half of the pixel 28 become larger.

As for the polyimide that is applied to the TFT substrate 14, as is shown in FIG. 7B, the mask 64 is positioned near the TFT substrate 14 with a strip of the silver 68 located opposite one segment (the upper portion in FIG. 7B) of the pixel that has not yet been irradiated with. The ultraviolet light irradiation device 60 is positioned closely above the mask 64 and ultraviolet light is employed to irradiate the TFT substrate 14. Thus, the ultraviolet light is employed to irradiate the other segment (the lower portion in FIG. 7B) of the pixel. As a result, a polyimide orientation film 24 is formed such that various pretilt angles are provided in a single pixel by employing the linearly polarized ultraviolet light to irradiate the TFT substrate 14.

In this manner, an orientation film 24 is provided that has such a characteristic that, when ultraviolet light is employed to irradiate the lower half of the pixel 28, the pretilt angles of the molecules 16A of the liquid crystal, which contacts the upper half of the pixel 28 of the TFT substrate 14, become smaller, and the pretilt angles of the molecules 16A of the liquid crystal 16, which contacts the upper portion of the pixel 28, become larger.

At step S4, with the orientation films 20 and 24 facing each other, the colour filter substrate 12 and the TFT substrate 14, on which the rubbing process and the irradiation with ultraviolet light have been performed, are located opposite to each other with an intervening predetermined cell gap. At step S5, the circumference is sealed and the liquid crystal 16, to which a predetermined chiral agent has been added, is introduced between the substrates.

At step S6, polarizing plates for display (not shown) are fixed to the external surfaces of the colour filter substrate 12 and the TFT substrate 14 so as to be a crossover Nicol, and the production of the liquid crystal display device 10 is complete.

By driving the liquid crystal display device 10 thus obtained, uniform image quality can be obtained with a very large viewing angle.

Further, the present applicants polarized ultraviolet light, having a wavelength of 257 nm and an irradiation energy of 200 mJ/cm$^2$, so that it was parallel to the rubbing direction (orientation direction), and employed it to irradiate a half of the substrate (corresponding to a half pixel) after the rubbing process was performed, thereby providing a substrate. The applicants then positioned the substrates opposite each other, so that the region that was irradiated with the ultraviolet light and the non-irradiated region were facing and the spray orientation was twisted 90°. They then introduced Liquid crystal between the substrates and the liquid crystal display device. As the results obtained by driving the pixel (the liquid crystal cell) of the liquid crystal display device at an alternate current, flickering was not yet detected.

A polyimide orientation film that is varied by irradiating the linearly polarized ultraviolet light will now be described in detail. Through various experiments, the present applicants determined that unique changes are generated by employing linearly polarized ultraviolet light to irradiate polyimide, which is employed to form an orientation film.

Figure 8:
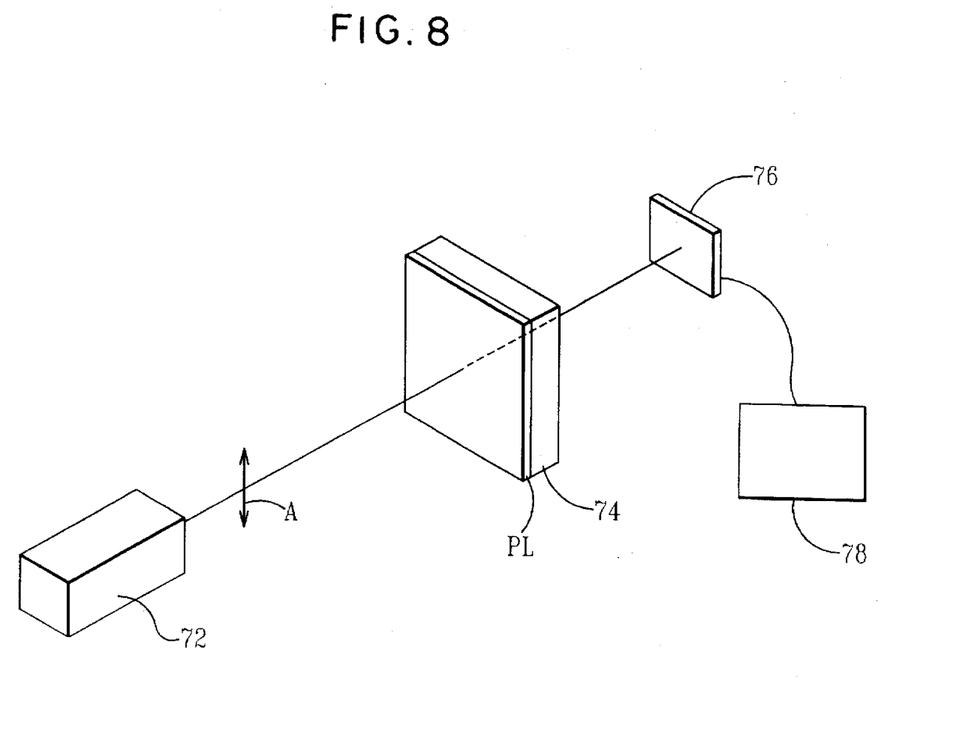
FIG. 8 is a perspective view illustrating a schematic arrangement that is employed to measure the transmittance characteristic of polyimide.

FIG. 8 is a diagram of the schematic arrangement with which the measurements are performed. A sensor 76, which is connected to a transmittance measuring device 78, is provided on the emitting side of an ultraviolet light source 72 that emits an almost parallel ultraviolet luminous flux, which is linearly polarized (in the direction indicated by the arrow A in FIG. 8). A glass 74, which is coated with polyimide PL, is located between the ultraviolet light source 72 and the sensor 76 to measure the transmittance. For this measurement, 350 angstrom of polyimide No. AL 1254, produced by Japan Synthetic Rubber Co., Ltd., was applied.

Figure 9:
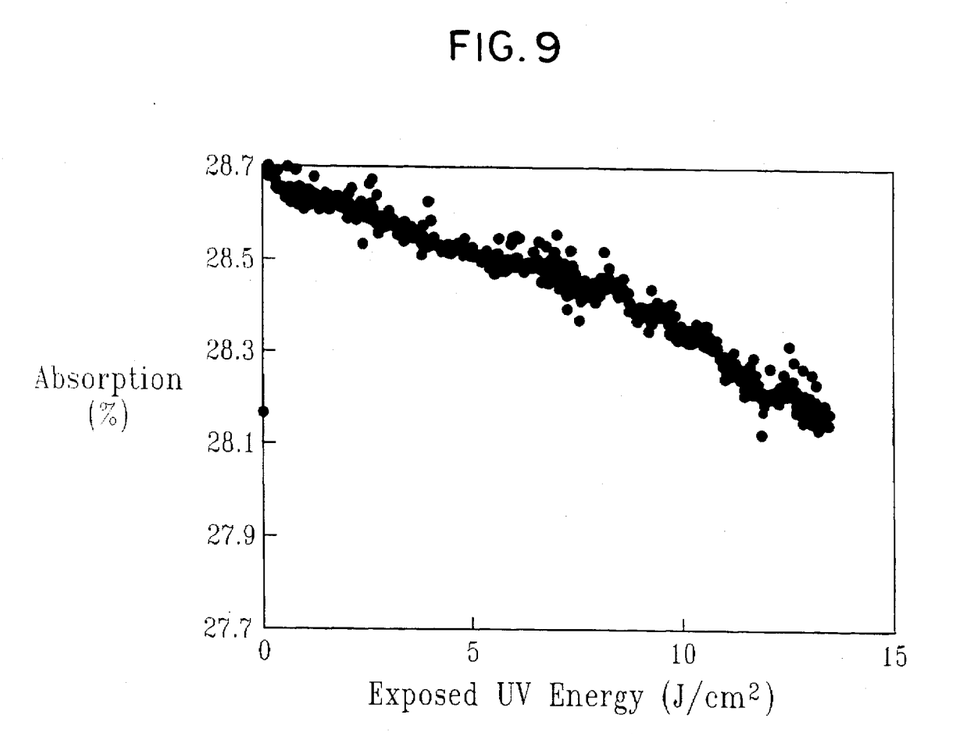
FIG. 9 is a graph showing the characteristic of the ultraviolet-light absorption rate of polyimide when irradiation with ultraviolet light has not yet been performed.
Figure 10:
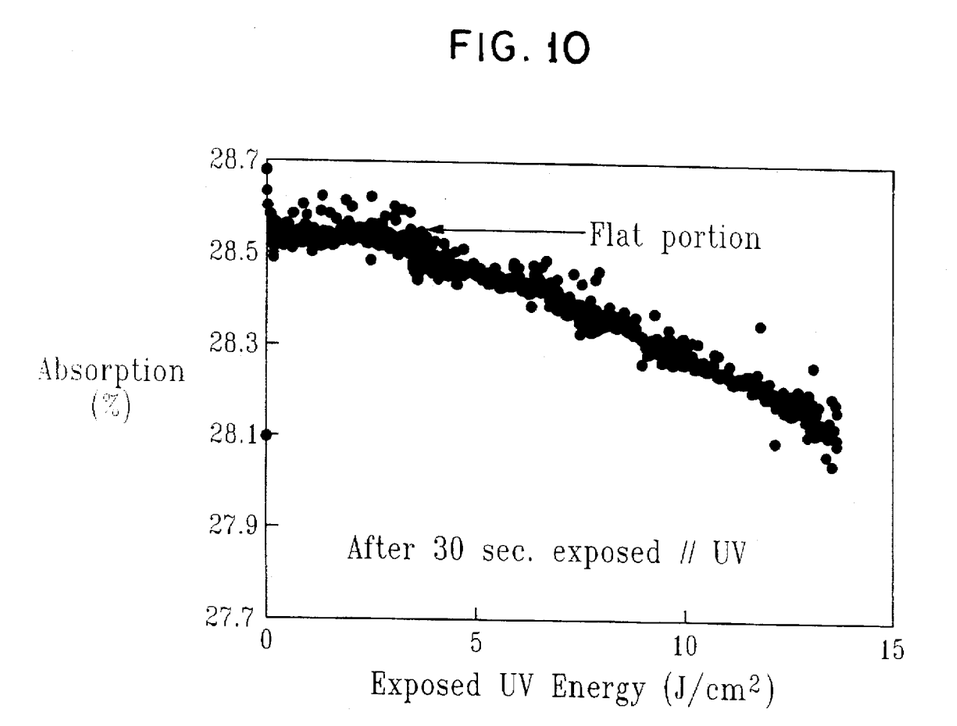
FIG. 10 is a graph showing the characteristic of the ultraviolet-light absorption rate of polyimide when irradiation with ultraviolet light has been performed in a direction that is parallel to a polarizing direction that was previously measured.
Figure 11:
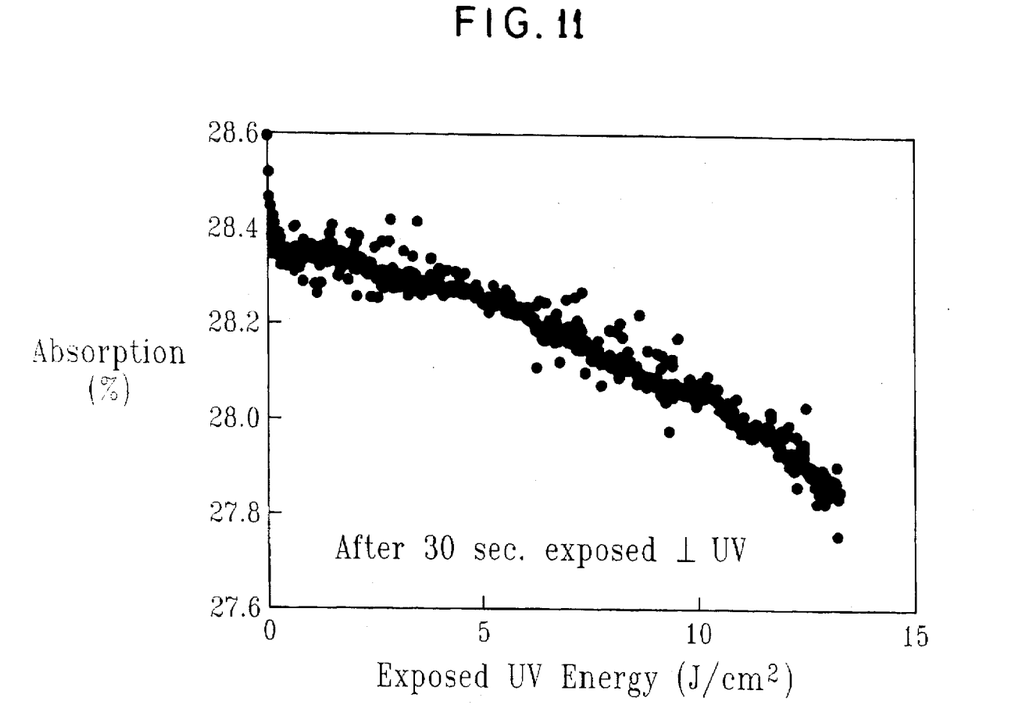
FIG. 11 is a graph showing the characteristic of the ultraviolet-light absorption rate of polyimide when irradiation WI tie ultraviolet light has been performed in a direction that is orthogonal to a polarizing direction that was previously measured.

In the graphs in FIGS. 9 through 11 are shown the changes in the ultraviolet light absorption rate for polyimide when a linearly polarized ultraviolet light having an irradiation energy of 22 mW/cm$^2$ is employed to irradiate the polyimide. The graph in FIG. 9 shows the characteristic ultraviolet light absorption rate when irradiation with ultraviolet light has not been performed. In other words, the absorption rate was measured while the glass plate 74 was only coated with polyimide. As is apparent from the graph, as the measured irradiation energy increases, the absorption rate gradually decreases. The graph in FIG. 10 shows the characteristic ultraviolet light absorption rate when the measurement, as in FIG. 9, was performed after irradiation with ultraviolet light was performed in advance in a linear polarizing direction, which is parallel to the polarizing direction (direction indicated by the arrow A in FIG. 8), when a measurement of 600 mJ/cm$^2$ was obtained. The graph in FIG. 11 shows the characteristic ultraviolet light absorption rate after irradiation with ultraviolet light, for which t he linear polarizing axis was rotated 90° (a direction that is perpendicular to the arrow A in FIG. 8) at the time of the measurement in FIG. 10 was performed. In FIG. 10, the characteristic that is obtained indicates that the absorption rate is almost constant immediately after the irradiation with ultraviolet light, while in FIG. 11, the characteristic that is obtained indicates that the absorption rate does not become constant and gradually decreases.

Figure 12A:
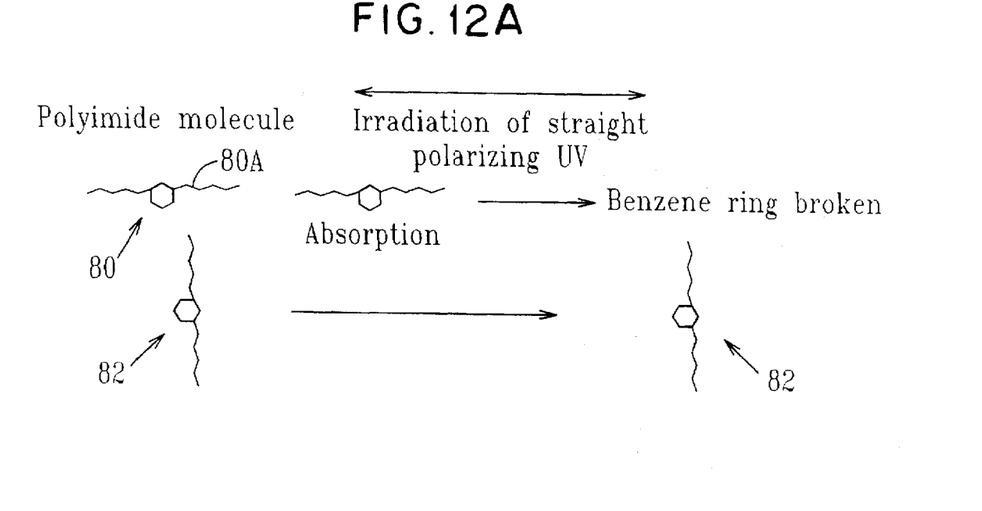
FIGS. 12A, 12B, and 12C are diagrams for explaining the process until a benzene ring is destroyed by the irradiation of ultraviolet light, with FIG. 12A, showing orthogonal polyimide molecules, FIG. 12B showing an orientation film where polyimide molecules are concentrated, and FIG. 12C showing the segment of the orientation film wherein the benzene ring has been destroyed.
Figure 12B:
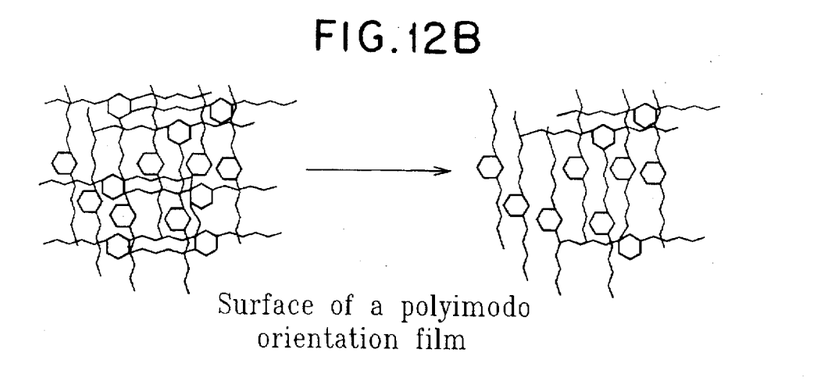
Figure 12C:
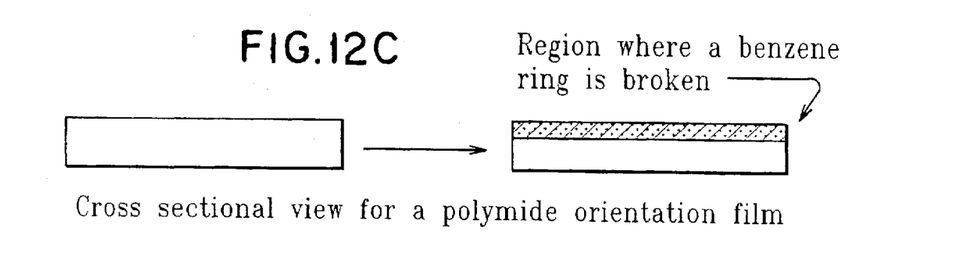

It is assumed that the change in the absorption rate that was observed following the rotation of the polarizing axis is caused by the oxidization due to the oxygen in the atmosphere and by ultraviolet light, and is derived from the destruction of benzene rings that absorb ultraviolet light. That is, activated oxygen atoms are dispersed in the polyimide, and benzene rings are destroyed by irradiation with ultraviolet light. As the oxidization is developed inward the polyimide film, the number of benzene rings is decreased, and accordingly, the absorption rate is reduced. More specifically, since a benzene ring, to which an alkyl side chain or a primaty chain parallel to the polarizing direction of ultraviolet light is linked, easily absorbs ultraviolet light, the benzene ring is easily destroyed. When irradiation with ultraviolet light in an identical polarizing direction is performed in advance, benzene rings that are normally found in the surface of the film have already been destroyed (shaded portion in FIG. 12C). Even if the oxidization is advanced, no change occurs in the absorption rate. Therefore, as is shown in FIG. 12A, when the ultraviolet light is employed to irradiate polyimide molecules 80 and 82, in which an alkyl side chain or a primary chain that is linked to the benzene ring is almost orthogonal, in the linear polarizing direction that is parallel to the direction of the alkyl side chain or the primary chain 80A of a polyimide molecule 80, only the benzene ring of the polyimide molecule 80 is destroyed and the polyimide molecule 82 is unaffected. Thus, as is shown in FIG. 12B, in the orientation films 20 and 24 where polyimide molecules are concentrated, benzene rings, to which an alkyl chain that is parallel to the polarizing direction is linked, are easily destroyed in consonance with the irradiation energy, and almost all the polyimide molecules, where an alkyl side chain or primary chain is almost perpendicular, are unaffected.

Therefore, as described above, it is assumed, for the characteristic portion in FIG. 10 where the absorption rate is almost constant, that since the irradiation with ultraviolet light that is in an identical polarized direction is performed in advance, and the benzene rings normally found on the surface of the film are already destroyed, even if the oxidization is advanced the absorption rate is not changed. When the oxidization is further advanced in a region where no benzene rings are destroyed, the absorption rate will be reduced. When the irradiation of ultraviolet light whose polarizing direction is rotated 90° is performed in advance, the benzene rings, to which are linked the alkyl side chains or the primary chains that are parallel to the current polarized direction, are destroyed. However, the benzene rings, to which are linked the alkyl side chains or the primary chains that are perpendicular to the polarized direction, will remain. Thus, the reduction of the absorption rate is begun immediately after the irradiation with the ultraviolet light.

It is apparent from the change of the absorption rate of ultraviolet light, i.e., the presence of the characteristic portion where the absorption rate is almost constant, that the benzene rings, to which are linked the alkyl side chains or the primary chains that are parallel to the polarized direction, are destroyed.

In the liquid crystal display device 10 of this embodiment, the orientation films 20 and 24 are formed of a single type of polyimide, so that the electric characteristic will not be unstable.

Further, since several types of polyimide are not used, fabrication procedures are not complicated. Although in this embodiment, the pixel 28 is divided into upper and lower portions and only one of them is irradiated with the ultraviolet light, the irradiation may be performed in both regions. In such a case, to change the pretilt angles in the individual regions, merely the irradiation energy levels of the ultraviolet light that is employed for irradiation need be different.

Although in this embodiment the pixel 28 is divided into upper and lower portions and ultraviolet light is employed to irradiate only one of them, the pixel 28 may be divided into multiple regions, such as four or six regions, to provide an arrangement of alternate ultraviolet light irradiation regions and non-irradiation regions. Or, the pixel 28 may be divided into multiple regions and the regions, which are irradiated with ultraviolet light at different energy levels, then arranged in a predetermined order. In either case, it is preferable that a colour filter substrate 12 and a TFT substrate 14 that have different pretilt angles be located opposite.

Although polyimide is used in this embodiment, the present invention is not limited to this. Any polymer, or a mixture of several types of polymers may be employed as long as its pretilt angle can be changed by an irradiation energy level of an electromagnetic wave, such as ultraviolet light. Example polymers in addition to polyimide are PVA (poly (vinyl alcohol)), PET (poly (ethylene terephthalate)), nylon, cellulose, and Teflon.

As described above, a substrate for a liquid crystal display device that can acquire a wide, preferable viewing angle range can be efficiently fabricated. Since the pretilt angle of liquid crystal in the direction that follows the rubbing direction can be changed, it is ensured to change the pretilt angle by a small volume of electromagnetic wave. Since the region in which the rotation of liquid crystal molecule due to the electric field is changed is provided, a liquid crystal display device that has an expanded preferable viewing angular range can be efficiently manufactured.

Since a plurality of directions in which liquid crystal molecules are rotated by the electric field are acquired by the independent substrates, or both substrates, a liquid crystal display device that has an further expanded preferable viewing angular range can be efficiently manufactured.

A plurality of directions, in which liquid crystal molecules are rotated by the electric field, are provided by the independent substrate, or both substrates, in a predetermined region of an overlapping portion of the substrates or a non-overlapping portion. Therefore, a liquid crystal display device that has an expanded preferable viewing angular range can be efficiently manufactured.

Since the pretilt angle of the liquid crystal in the direction that follows the rubbing direction can be varied, the change of the pretilt angle can be generated by a small volume of electromagnetic wave.

When the liquid crystal is settled in the polymer orientation film, the substantial pretilt angle of the liquid crystal, which is a direction for aligning the liquid crystal, can be changed. The change of the pretilt angle can therefore be generated by a small volume or amount of electromagnetic wave.

Since the pretilt angle can be varied in a single pixel, a liquid crystal display device, of which preferable viewing angular range can be expanded for each pixel and in which the flickering is restricted, can be efficiently fabricated. It is possible that a preferable viewing angular characteristic where flickering is restricted can be acquired with a simple structure. It is possible that a more preferable viewing angular characteristic where flickering is restricted can be acquired by changing the pretilt angle of liquid crystal in the direction that follows the rubbing direction.

We claim:

1. A method of manufacturing a liquid crystal display device comprising the steps of:

applying polyamide to a first substrate to form a polyimide film;

rubbing the first substrate, on which the polyimide film is formed, to provide an orientation direction and forming a first polyimide orientation film;

irradiating, with a linearly polarized electromagnetic wave, at least one segment of the first substrate which was rubbed;

applying polyimide to a second substrate to form a polyimide film;

rubbing the second substrate, on which the polyimide film is formed, to provide an orientation direction and forming a second polyimide orientation film;

irradiating, with a linearly polarized electromagnetic wave, at least one segment of the second substrate which was rubbed;

positioning the first and second substrates bearing the first and second polyimide orientation films at a predetermined interval from each other such that said films face each other; and introducing liquid crystal between the first and second substrates.

2. A method for manufacturing a liquid crystal display device, as claimed in claim 1 wherein at the step of positioning the first and second substrate, the polyimide orientation films are positioned facing each other so that a region of the first substrate, which has been irradiated by an electromagnetic wave, and a region of said second substrate, which has been irradiated by an electromagnetic wave, overlap partially or entirely, or do not overlap.

3. A method, for manufacturing a liquid crystal display device as claimed in claim 1, wherein the linear polarizing direction corresponds to the direction in which the polyimide orientation film is rubbed.

4. A method for manufacturing a liquid crystal display device as claimed in claim 1, wherein the linear polarizing direction is the direction in which liquid crystal is aligned when said liquid crystal is introduced to said polyimide orientation film.

5. A method for manufacturing a liquid crystal display device as claimed in claim 1, wherein in the step for irradiating with the linearly polarized electromagnetic wave, a linearly polarized ultraviolet light is employed to irradiate segments of a region that corresponds to a pixel.

6. A liquid crystal display device comprising:

a first substrate;

a first orientation polyimide film disposed on said first substrate, said first orientation polyimide film having at least one segment whose molecules are aligned in a linear direction;

a second substrate;

a second orientation polyimide film disposed on said second substrate; and a liquid crystal material disposed between said first and said second orientation polyimide films.

7. A device in accordance with claim 6 wherein said first orientation polyimide film includes benzene rings to which alkyl side chains are linked in a single direction.

* * * * *